Patented May 23, 1933

1,910,100

UNITED STATES PATENT OFFICE

WILLIAM HOWLETT GARDNER, OF NEW YORK, N. Y.

SHELLAC-ESTER LACQUER

No Drawing.  Application filed February 12, 1931.  Serial No. 515,408.

This invention relates to a lacquer embodying cellulose and characterized by unusual elasticity, and gloss when dried in a film, in contrast with the commercial cellulose ester lacquer, and which, in addition, possesses greater adhesion and greater resistance to deterioration from the actinic rays of sunlight. Further characteristics of the lacquer will hereinafter appear.

In the manufacture of lacquers, four general types of substances are commercially employed: cellulose esters, resins, plasticizers and solvents. The first three constitute a film-forming and non-volatile part of the lacquer. The cellulose ester imparts toughness to the film, the resins add gloss, adhesion and hardness and the plasticizers add flexibility. However, it is difficult to secure the proper balance in such a lacquer. In lacquer-compounds an increase in the quantity of cellulose ester above a critical point, with a view to increasing toughness of the film, will result in impairing the gloss. It is also recognized that the cellulose ester decreases resistance of the film to actinic rays of light. Also, when an increase in the quantity of resins, beyond certain limits, to add hardness or gloss, will result in brittleness of the film. Plasticizers will decrease brittleness by adding flexibility, but will detract from hardness. Further difficulties in the formulation of nitro-cellulose lacquers appear in the character and relative proportions of cellulose ester solvents and the diluents employed for solution of the resins and to render the lacquer free-flowing.

Solvent mixtures for the cellulose esters may be butyl or ethyl acetate and the so-called diluents may be alcohols and/or hydrocarbons. A solvent mixture containing too much diluent will precipitate the cellulose ester, and in a like manner, increase of cellulose ester solvents beyond certain limits, will precipitate the resin. Also, cellulose ester and resins may mutually effect the solubility of each other in different mixtures.

Solvent mixture compositions change on evaporation because of the difference in rates of evaporation of the different constituents in some of their mixtures. Hence, in many cases, solvent mixtures are comparatively limited in their range of composition both from their action and from commercial considerations, primarily, cost.

I have discovered that shellac ester may be used not only as both resin and plasticizer in a nitro-cellulose lacquer, but that there is a peculiar compatability between cellulose ester and shellac ester enabling the use of large proportions of shellac esters without brittleness, with a gloss far superior to that imparted by the resins customarily employed for the purpose and with an adhesion quality, a resistance to the bleeding of pigments, and a resistance to actinic rays which protects both pigment and cellulose.

Shellac has been shown to contain chemically both acid and alcoholic groups. It is known that when substances contain either of these groups they can usually be condensed with other substances under the proper conditions, with the elimination of water or hydrogen chloride, giving products of different properties. When the condensations are effected between an alcohol (hydroxyl) group or groups and an acid (carboxyl) group or groups the products are known as esters. Several neutral esters of shellac have been prepared by the condensation of monohydric alcohols or substituted monohydric alcohols with the carboxyl groups of shellac in the presence of suitable catalysts.

In my lacquer, the amount of ester used is limited only by the hardness of the film desired. Resins may be added, and the character of the cellulose ester is such that low-cost solvents may be employed. The nitro-cellulose constituent of the lacquer will remain in solution in its usual solvents, such as butyl or ethyl acetate in the presence of shellac ester in substantially large amounts of lower-cost alcohols (non-solvent for cellulose) and aromatic hydrocarbons.

As examples of my lacquer, the following are recited:

1. 
| | Parts by weight |
|---|---|
| Cellulose ester (dry) | 8 |
| Wetting alcohol | 3 |
| Methyl ester of bleached shellac | 20 |
| Butyl acetate | 24 |
| Toluene | 40 |

2.
| | Parts by weight |
|---|---|
| Cellulose ester (dry) | 5.5 |
| Wetting alcohol | 2.3 |
| Methyl ester of bleached shellac | 11.0 |
| Ester gum | 11.0 |
| Butyl acetate | 14.2 |
| Toluene | 44.0 |

3.
| | Parts by weight |
|---|---|
| Cellulose ester (dry) | 11.9 |
| Wetting alcohol | 5.1 |
| Methyl ester of shellac | 9.5 |
| Butyl acetate | 30.6 |
| Toluene | 42.9 |

4.
| | Parts by weight |
|---|---|
| Cellulose ester (dry) | 8 |
| Wetting alcohol | 3 |
| Butyl ester of bleached shellac | 20 |
| Butyl acetate | 24 |
| Toluene | 40 |

5.
| | Parts by weight |
|---|---|
| Cellulose ester | 8.9 |
| Dammar (dewaxed) | 5.9 |
| Butyl ester of bleached shellac | 10.0 |
| Alcohol | 16.0 |
| Ethyl acetate | 2.5 |
| Petroleum distillate (80–130° C.) | 4.9 |
| Butyl acetate | 24.4 |
| Dibutyl phthalate | 1.0 |

It will be noted from the above examples that the ratio of the shellac ester may be widely varied. In Examples 1 and 4 the shellac ester is substantially in excess of the cellulose ester, whereas, in example 3, the cellulose is in excess of the shellac ester. In examples 1 to 4, inclusive, the primarily solvent for the shellac ester and the diluent is toluene, whereas, in example 5, alcohol is employed in conjunction with petroleum distillate and ethyl acetate.

Summarizing, my lacquer is characterized by the presence therein of a shellac ester, particularly in substitution of the usual resins and plasticizers, which imparts a novel hardening, gloss-forming, flexible characteristic to the lacquer, protecting both the cellulose ester and pigment from deterioration by the actinic rays of sunlight, protecting the pigment from bleeding, i. e., from working through the film and rubbing off, and imparting great adhesive qualities to the lacquer. From the lacquer is removed the brittleness of film usually caused by the resins commonly used to impart gloss and hardness. All of this is secured by an ingredient so compatible with cellulose ester that simple, inexpensive formulas may be employed as compared with the relatively complex and expensive solvent formulas now commercially used with cellulose ester lacquer, resins and plasticizers.

It will be understood that the examples given above are merely illustrative of the invention and that formulas may be widely varied from those given without departing from the spirit of the invention.

Having described my invention, what I claim and desire to secure by Letters Patent, is as follows:

1. A lacquer containing an ester of shellac, a cellulose ester and solvent.
2. A lacquer containing a neutral ester of shellac, a cellulose ester and solvent.
3. A lacquer containing a methyl ester of shellac, a cellulose ester and solvent.
4. A lacquer containing a butyl ester of shellac, a cellulose ester and solvent.
5. A lacquer containing an ester of shellac, a resin, a cellulose ester, and solvent.

In testimony whereof, I have signed my name to this specification.

WILLIAM HOWLETT GARDNER.